United States Patent
Zhuang et al.

(10) Patent No.: US 11,323,527 B2
(45) Date of Patent: May 3, 2022

(54) DATA DISTRIBUTION SYSTEM, METHOD AND COMPUTER-READABLE STORAGE MEDIUM

(71) Applicant: WANGSU SCIENCE & TECHNOLOGY CO., LTD., Shanghai (CN)

(72) Inventors: Xiaochuan Zhuang, Shanghai (CN); Bin Guo, Shanghai (CN); Jujun You, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 361 days.

(21) Appl. No.: 16/484,708

(22) PCT Filed: Oct. 30, 2018

(86) PCT No.: PCT/CN2018/112684
§ 371 (c)(1),
(2) Date: Aug. 8, 2019

(87) PCT Pub. No.: WO2020/052017
PCT Pub. Date: Mar. 19, 2020

(65) Prior Publication Data
US 2021/0337038 A1    Oct. 28, 2021

(30) Foreign Application Priority Data

Sep. 14, 2018 (CN) .......................... 201811072603.7

(51) Int. Cl.
*H04L 67/55* (2022.01)
(52) U.S. Cl.
CPC ................................... *H04L 67/26* (2013.01)
(58) Field of Classification Search
CPC ..................................................... H04L 67/26
See application file for complete search history.

(56) References Cited

U.S. PATENT DOCUMENTS

2011/0022471 A1* 1/2011 Brueck ................. G06Q 30/02
705/14.61
2012/0079578 A1* 3/2012 Dachiraju ............ A61N 5/0618
726/7
(Continued)

FOREIGN PATENT DOCUMENTS

CN   101860471 A   10/2010
CN   102710966 A   10/2012
(Continued)

OTHER PUBLICATIONS

The China National Intelleectual Property Administration (CNIPA) the China Search Report for 201811072603.7, dated Sep. 25, 2019 24 Pages.
(Continued)

*Primary Examiner* — Wing F Chan
*Assistant Examiner* — Billy H Ng

(57) ABSTRACT

A data distribution system includes: an edge stream-pushing server configured to receive streaming media data packets sent by a stream pusher, serialize the streaming media data packets, and forward the serialized streaming media data packets to a plurality of central servers; a central server configured to cache the serialized streaming media data packets, if a serialized back-to-source request from the edge stream-pulling server is received, determine, a start position of to-be-transmitted streaming media data packets according to the serialized back-to-source request, and send the cached streaming media data packets to the edge stream-pulling server according to the start position; and an edge stream-pulling server configured to deserialize received streaming media data packets to restore the received streaming media data packets, and send the restored streaming media data packets to a user terminal.

20 Claims, 7 Drawing Sheets

(56) References Cited

U.S. PATENT DOCUMENTS

| | | | |
|---|---|---|---|
| 2012/0265892 A1 | 10/2012 | Ma et al. | |
| 2013/0166625 A1 | 6/2013 | Swaminathan et al. | |
| 2014/0108524 A1* | 4/2014 | Good | H04N 21/2362 709/204 |
| 2017/0324796 A1 | 11/2017 | Knox et al. | |

FOREIGN PATENT DOCUMENTS

| | | |
|---|---|---|
| CN | 103634610 A | 3/2014 |
| CN | 103986976 A | 8/2014 |
| CN | 105847854 A | 8/2016 |
| CN | 105848011 A | 8/2016 |
| CN | 106714334 A | 5/2017 |
| CN | 108347622 A | 7/2018 |
| CN | 108366292 A | 8/2018 |

OTHER PUBLICATIONS

The World Intellectual Property Organization (WIPO) International Search Report and Written Opinion for PCT/CN2018/112684 dated May 31, 2019 9 pages.

* cited by examiner

DATA DISTRIBUTION SYSTEM, METHOD AND COMPUTER-READABLE STORAGE MEDIUM

CROSS-REFERENCES TO RELATED APPLICATIONS

This application is a national phase entry under 35 U.S. § 371 of International Application No. PCT/CN2018/112684 filed on Oct. 30, 2018, which claims priority of Chinese Patent Application 201811072603.7, filed with the State Intellectual Property Office of P. R. China on Sep. 14, 2018, the entire contents of all of which are incorporated herein by reference.

FIELD OF DISCLOSURE

The present disclosure generally relates to the field of streaming media distribution technology and, more particularly, relates to a data distribution system, method and computer-readable storage medium thereof.

BACKGROUND

With the widespread use of PCs and mobile devices, the bandwidth of subscribers has been continuously improved, and interactive live streaming services have become increasingly widespread. Various interactive live streaming websites and Apps have been launched one after another, which causes the competitive pressure to become increasingly intense. At present, the majority of the live streaming service providers choose a content delivery network (CDN) or a cloud service provider for live streaming acceleration. With the development of technology, end users have continuously improved the quality of live streams, and end users have higher and higher requirements for live streaming quality.

However, the applicants have found that the existing technologies have at least the following problems: the live streaming screen is prone to problems such as image repetition, stuttering, and unsmoothness, etc., which results in poor user experience.

BRIEF SUMMARY OF THE DISCLOSURE

The objective of the present disclosure is to provide a data distribution system, method and computer-readable storage medium thereof, which help prevent frequently occurring problems, such as image repetition, stuttering, and unsmoothness, of live streaming images, thereby improving user experience.

To solve the above problems, the embodiments of the present disclosure provide a data distribution system, which includes: an edge stream-pushing server, a plurality of central servers, and an edge stream-pulling server; where the edge stream-pushing server is configured to receive streaming media data packets sent by a stream pusher, serialize the streaming media data packets, and forward the serialized streaming media data packets to the plurality of central servers; a central server is configured to cache the serialized streaming media data packets, if a serialized back-to-source request from the edge stream-pulling server is received, determine, a start position of to-be-transmitted streaming media data packets according to the serialized back-to-source request, and send the cached streaming media data packets to the edge stream-pulling server according to the start position; and the edge stream-pulling server is configured to deserialize received streaming media data packets to restore the received streaming media data packets, and send the restored streaming media data packets to a user terminal.

The embodiments of the present disclosure further provide a data distribution method to be applied in a data distribution system. The method includes: receiving, by an edge stream-pushing server, streaming media data packets sent by a stream pusher; serializing, by the edge stream-pushing server, the streaming media data packets, and forwarding, by the edge stream-pushing server, the serialized streaming media data packets to a plurality of central servers; caching, by the plurality of central servers, the serialized streaming media data packets; if a central server receives a serialized back-to-source request from an edge stream-pulling server, determining, by the central server, a start position of to-be-transmitted streaming media data packets according to the serialized back-to-source request; sending, by the central server, the cached streaming media data packets to the edge stream-pulling server according to the start position of the to-be-transmitted streaming media data packets; deserializing, by the edge stream-pulling server, received streaming media data packets to restore the received streaming media data packets; and sending, by the edge stream-pulling server, the restored streaming media data packets to a user terminal.

The embodiments of the present disclosure further provide a computer-readable storage medium storing a computer program. The computer program, when executed by a processor, implements the above-described data distribution method.

Compared with the existing technologies, in order to solve the technical problems in the existing technologies, the applicants of the disclosed embodiments in the present disclosure have analyzed the existing live streaming processes. After careful research, it is found that the problem of repetition and stuttering of the streaming images in the exiting live streaming processes is: when the edge stream-pushing server sends the streaming media data packets to different servers for backup and caching, due to different data transmission rates among different transmission links, data cached in real time by each central server is inconsistent. Caching effects, such as GOP (Group-Of-Picture) and quick startup, may cause data duplication or data lost. Therefore, in the disclosed embodiments of the present disclosure, the edge stream-pushing server serializes the streaming media data packets, so that the streaming media data packets cached by the central servers are serialized streaming media data packets. When the stream-pulling server sends a serialized back-to-source request, the central servers easily find the start position of the to-be-transmitted streaming media data packets according to the cached serialized streaming media data packets, and send the cached streaming media data packets to the edge stream-pulling server according to the start position. The stream-pulling server deserializes the received streaming media data packets and sends the deserialized streaming media data packets to the user terminal. This helps improve the smoothness of video images played on the user terminal, satisfy users' watching requirements, effectively prevent the occurrence of stuttering, repetition, and other problems, thereby improving users' live stream-watching experience.

Further, the edge stream-pushing server is also configured to receive a metadata data packet sent by the stream pusher, add stream-pushing time information to the metadata data packet, and serialize the streaming media data packets according to the stream-pushing time information. This facilitates effective serialization processing on the streaming media data packets.

Further, the edge stream-pushing server is also configured to determine a serialization starting point according to the stream-pushing time information, and serialize the streaming media data packets according to the serialization starting point. By setting a serialization starting point for the serialized streaming media data packets, it helps the serialization to be processed sequentially starting from the serialization starting point.

Further, the edge stream-pushing server is also configured to generate, for each of the streaming media data packets, a serial number of each of the streaming media data packets using a serial serialization interface, and encapsulate the streaming media data packets into the serialized streaming media data packets according to the serialization starting point and the serial number of each of the streaming media data packets. The serial numbers generated through the serial serialization interface are useful in signifying the sequence of different streaming media data packets, which is convenient for serializing the streaming media data packets.

Further, the serialized back-to-source request includes a serial number, and the central server is also configured to determine a position of a data packet, to which the serial number included in the serialized back-to-source request belongs, as the start position of the to-be-transmitted streaming media data packets. This helps a central server to quickly determine the start position of the to-be-transmitted streaming media data packets according to the received serialized back-to-source request.

Further, the edge stream-pulling server is also configured to, when a stream-pulling request sent by the user terminal is received, designate a central server, and send a regular back-to-source request to the designated central server; and the designated central server is also configured to, if the regular back-to-source request is received, determine the start position of the to-be-transmitted streaming media data packets according to the regular back-to-source request, and send the cached streaming media data packets to the edge stream-pulling server according to the start position of the to-be-transmitted streaming media data packets.

Further, the edge stream-pulling server is also configured to, if it is detected that a regular back-to-source process fails, switch the designated central server, and send the serialized back-to-source request to the switched central server. Accordingly, even if the regular back-to-source process fails, the designated central server can be switched in a targeted manner. By sending the serialized back-to-source request to a switched central server, it helps improve the possibility of the back-to-resource success. Through switching the internal link, an accurate breakpoint retransmission function may be implemented, which further ascertains the continuity and stability of streaming media data packet transmission, ensures the consistency of streaming media data packets sent to a user terminal, and improves a user's live stream-watching experience.

Further, the edge stream-pushing server is also configured to encrypt the serialized streaming media data packets by using a preset encryption algorithm, and forward the encrypted streaming media data packets to the plurality of central servers; and the edge stream-pulling server is also configured to decrypt the received encrypted streaming media data packets by using a preset decryption algorithm. This ensures the security and confidentiality of streaming media data packets during transmission.

Further, the edge stream-pushing server is also configured to forward the encrypted streaming media data packets to the plurality of central servers by using a preset private protocol. The private protocol helps to ensure the privacy and exclusivity of streaming media data packets during transmission.

Further, the edge stream-pushing server is also configured to serialize newly received streaming media data packets when a renewed stream-pushing is detected. This helps ensure that when there is a renewed stream-pushing, the newly received streaming media data packets may also be serialized, so that it can be satisfied that all the live streaming images will not have problems, such as image repetition, stuttering, etc., under different stream-pushing requests, thereby improving users' watching experience.

BRIEF DESCRIPTION OF THE DRAWINGS

One or more embodiments of the present disclosure are exemplified by the accompanying drawings. The exemplary illustrations should not be constructed as a limitation to the embodiments of the present disclosure. In the accompanying drawings, like reference numerals refer to like elements. Unless specifically stated, the figures in the accompanying drawings do not constitute a scale limitation.

DETAILED DESCRIPTION

To make the objective, technical solutions, and advantages of the present disclosure clearer, the embodiments of the present disclosure will be made in detail hereinafter with reference to the accompanying drawings. A person skilled in the art may understand that, in order to provide a reader with a better understanding of the present disclosure, numerous technical details are set forth in the various embodiments of the present disclosure. However, even without these technical details and various variations and modifications based on the following embodiments, the technical solutions claimed in the present disclosure may still be implemented.

Embodiment 1 of the present disclosure relates to a data distribution system, which includes: an edge stream-pushing server, a plurality of central servers, and an edge stream-pulling server. The edge stream-pushing server is configured to receive streaming media data packets sent by a stream-pusher, serialize the received streaming media data packets, and forward the serialized streaming media data packets to the plurality of central servers. A central server is configured to cache the serialized streaming media data packets. If a serialized back-to-source request from the edge stream-pulling server is received, the central server determines a start position of the to-be-transmitted streaming media data packets according to the serialized back-to-source request, and transmitting the cached streaming media data packets to the edge stream-pulling server according to the start position. The edge stream-pulling server is configured to deserialize the received streaming media data packets to restore the received streaming media data packets, and send the restored streaming media data packets to a user terminal. The method helps prevent some frequently occurring problems on the live streaming images, such as repetition, stuttering, and unsmoothness, etc., thereby improving user experience. The implementations of the data distribution system of the disclosed embodiment will be made in detail hereinafter. The following description is merely for easy understanding of the provided implementation details, but should not be constructed as the requirement for implementing the technology disclosed herein.

Figure 1:
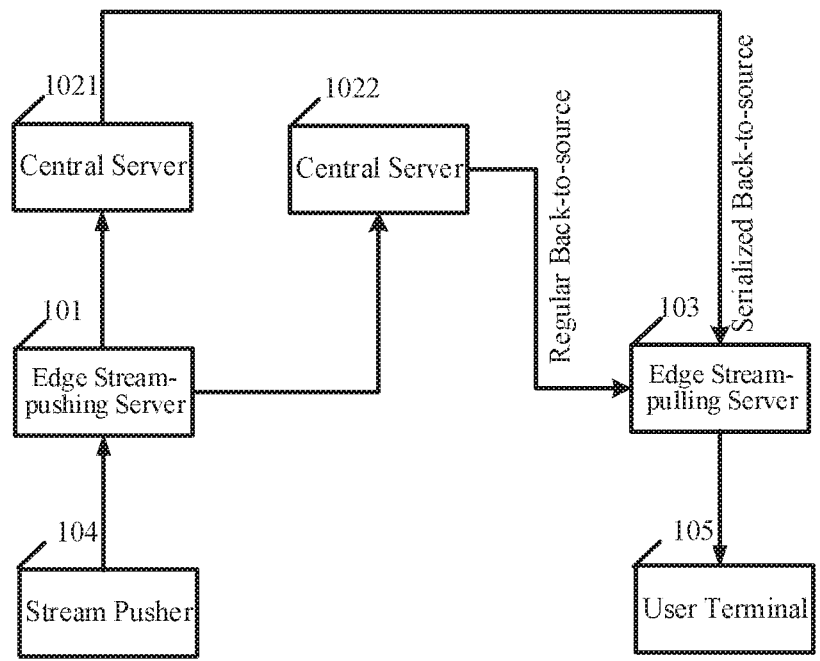
FIG. 1 is a schematic structural diagram of a data distribution system according to some embodiments of the present disclosure.

As shown in FIG. 1, the data distribution system in the disclosed embodiment specifically includes: an edge stream-pushing server 101, a central server 1021, a central server 1022, and an edge stream-pulling server 103. It should be noted that the central servers in the disclosed embodiment may include any number of central servers. In the disclosed embodiment, only two central servers shown in the figure are taken as an example. However, the actual applications are not limited to the illustrated number of central servers.

Specifically, when an anchor pushes a stream, the stream pusher 104 may send a stream-pushing request to the edge stream-pushing server 101, thereby establishing a communication connection between the stream pusher 104 and the edge stream-pushing server 101. The stream pusher 104 may send the live streaming content to the edge stream-pushing server 101 in the form of streaming media data packets. The edge stream-pushing server 101 serializes the streaming media data packets, for example, assigning a serial number for a streaming media data packet that originally does not have a serial number. This is convenient for directly locating a streaming media data packet corresponding to a serial number based on different serial numbers. The edge stream-pushing server 101 forwards the serialized streaming media data packets to the plurality of central servers. For example, in the disclosed embodiment, the edge streaming-push server 101 forwards the serialized streaming media data packets to the central server 1021 and the central server 1022 in FIG. 1. In real applications, if there are other central servers, the edge stream-pushing server 101 also forwards the serialized streaming media data packets to those other central servers.

It should be noted that the central servers cache the serialized streaming media data packets when the serialized streaming media data packets forwarded by the edge stream-pushing server 101 are received. That is, the plurality of central servers back up and cache the received serialized streaming media data packets. Therefore, when a central server receives a back-to-source request sent by the edge stream-pulling server 103, the cached streaming media data packets may be transmitted according to the back-to-source request. Even if one of the central servers fails to return the source, since the streaming media data packets are cached in several central servers, the central server may be switched, and the cached streaming media data packets may be sent by another central server. For example, in the disclosed embodiment, when the serialized streaming media data packets forwarded by the edge stream-pushing server 101 are received, both the central server 1021 and the central server 1022 cache the received streaming media data packets, to achieve a backup and caching effect for the received streaming media data packets.

A central server may receive different types of back-to-source requests. The types of back-to-source requests may include: a regular back-to-source request and a serialized back-to-source request. A regular back-to-source request may not include a serial number for a streaming media data packet. When a central server receives a regular back-to-source request, the central server may send back the cached streaming media data packets by using a quick startup mode or a keyframe mode. A serialized back-to-source request may include a serial number of a streaming media data packet. However, in real applications, a serialized back-to-source request may also include other information, which the disclosed embodiment is not intended to limit. When a serialized back-to-source request is received, a central server sends back the cached streaming media data packets by starting from the serial number included in the serialized back-to-source request.

It should be further noted that, in determining the start position of the to-be-transmitted streaming media data packets, a central server may use different approaches when different types of back-to-source requests are received. If a regular back-to-source request is received, the start position of the to-be-transmitted streaming media data packets is determined according to the regular back-to-source request. For example, the method for determining the start position of the to-be-transmitted streaming media data packets may include searching forward for a position where the keyframe is located based on the current time and the quick startup time. The position where the keyframe is located is determined as the start position of the to-be-transmitted streaming media data packets. If a serialized back-to-source request is received, the start position of the to-be-transmitted streaming media data packets is determined according to the serialized back-to-source request. For example, a serialized back-to-source request may include a serial number of a streaming media data packet. When a serialized back-to-source request is received, the central server determines the position of a data packet to which the identified serial number belongs as the start position.

It should be also noted that, after determining the start position of the to-be-transmitted streaming media data packets, a central server may send the cached streaming media data packets to the edge stream-pulling server according to the start position, that is, start sending the cached streaming media data packets from the start position. The cached streaming media data packets sent by the central server are the serialized streaming media data packets forwarded by the edge stream-pushing server 101.

In the disclosed embodiment, when receiving a stream-pulling request from the user terminal 105, the edge stream-pulling server 103 sends a back-to-source request to a central server, to request the central server to send back the cached streaming media data packets. In the disclosed embodiment, when receiving a stream-pulling request from the user terminal 105, the edge stream-pulling server 103 may first send a regular back-to-source request. Since there are multiple central servers, it is necessary to designate a central server to send the regular back-to-source request. Specifically, a central server may be designated according to the domain name of each central server in combination with a hash algorithm. For example, if the designated central server is the central server 1022 in FIG. 1, the edge stream-pulling server 103 sends a regular back-to-source request to the central server 1022.

Next, if the regular back-to-source process fails, the type of back-to-source request may be changed, and a serialized back-to-source request is sent to the central server. If a regular back-to-source request is sent again, then no matter which central server (either the central server 1021 or the central server 1022 in FIG. 1) receives the regular back-to-source request, after receiving the request, the central server will determine the start position of the to-be-transmitted streaming media data packets according to the regular back-to-source request. Then, the streaming media data packets received by the edge stream-pulling server 103 this time may not be able to join together with the streaming media data packets received after the regular back-to-source process last time. Jump or repetition may then occur, resulting in the live streaming image(s) getting stuck or repeated. Therefore, after the regular back-to-source process fails, the type of back-to-source request needs to be changed, that is, a serialized back-to-source request is sent to the central server. Accordingly, the central server that receives the serialized back-to-source request may determine the start position of the to-be-transmitted streaming media data packets according to the serial number included in the serialized back-to-source request. The serial number included in the serialized back-to-source request may be the serial number of the streaming media data packet received latest by the edge stream-pulling server 103. Therefore, when the edge stream-pulling server 103 receives the streaming media data packets sent by the central server according to the serialized back-to-source request, the received streaming media data packets may join together with the streaming media data packets received after the regular back-to-source process last time. This prevents the streaming media data packets from jumping or repeating, thereby ensuring the smoothness of the live streaming images.

It should be noted that, since the streaming media data packets are cached in multiple central servers, when sending a serialized back-to-source request, the edge stream-pulling server 103 may switch a central server and send the serialized back-to-source request to the switched central server. Accordingly, a back-to-source failure, caused by the disconnection or overload of the back-to-source link of a central server that originally sent the regular back-to-source request, may be prevented. For example, the edge stream-pulling server 103 first sends a regular back-to-source request to the central server 1022. If the regular back-to-source process fails due to the disconnection of the back-to-source link, even if a serialized back-to-source request is sent to the central server 1022 again, the edge stream-pulling server 103 may be still unable to receive the streaming media data packets sent by the central server 1022 due to the disconnection of the back-to-source link. Therefore, the central server needs to be switched, and the serialized back-to-source request is sent to the switched central server 1021.

Further, since the edge stream-pushing server 101 initially has performed the serialization processing on the streaming media data packets, the edge stream-pulling server 103 needs to deserialize and restore the received streaming media data when the streaming media data packets are received, and send the restored streaming media data packets to the user terminal 105, to allow the user terminal 105 to play the video for watching by a user. It should be noted that once the serialized streaming media data packets are received, the edge stream-pulling server 103 performs a deserialization processing to restore the received streaming media data packets, and sends the restored streaming media data packets to the user terminal 105. For example, after receiving the streaming media data packets sent by a central server based on a regular back-to-source request, the received streaming media data packets may be directly restored and sent to the user terminal 105, no matter whether the regular back-to-source process is successful or not. If the regular back-to-source process fails, the edge stream-pulling server 103 sends a serialized back-to-source request to a switched central server. After receiving the streaming media data packets sent by the switched central server, the retransmitted streaming media data packets are restored, and then sent to the user terminal 105.

When the user terminal 105 receives and plays the deserialized streaming media data packets sent by the edge stream-pulling server 103, what the user terminal 105 has received are the deserialized streaming media data packets. Even if the streaming media data packets are received based on different types of back-to-source request, the streaming media data packages may join together well, thereby ensuring the smoothness of the live streaming images and no occurrence of repetition or stuttering.

Compared with the existing technologies, in order to solve the technical problems in the existing technologies, the applicants of the disclosed embodiment have analyzed the existing live streaming processes. After careful research, it is found that the problem of repetition and stuttering of the streaming images in the exiting live streaming processes is: when the edge stream-pushing server sends the streaming media data packets to different servers for backup and caching, due to different data transmission rates among different transmission links, data cached in real time by each central server is inconsistent. Caching effects, such as GOP (Group-Of-Picture) and quick startup, may cause data duplication or data lost. Therefore, in the disclosed embodiments of the present disclosure, the edge stream-pushing server serializes the streaming media data packets, so that the streaming media data packets cached by the central servers are serialized streaming media data packets. When the stream-pulling server sends a serialized back-to-source request, the central servers easily find the start position of the to-be-transmitted streaming media data packets according to the cached serialized streaming media data packets, and send the cached streaming media data packets to the edge stream-pulling server according to the start position. The stream-pulling server deserializes the received streaming media data packets and sends the deserialized streaming media data packets to the user terminal. This helps improve the smoothness of video images played on the user terminal, satisfy users' watching requirements, effectively prevent the occurrence of stuttering, repetition, and other problems, thereby improving users' live stream-watching experience.

Embodiment 2 of the present disclosure relates to a data distribution system. Embodiment 2 is a further improvement of Embodiment 1. The main improvement lies in that: in Embodiment 2 of the present disclosure, the edge stream-pushing server is further configured to receive a metadata data packet sent by the stream pusher, add stream-pushing time information to the metadata data packet, and serialize the streaming media data packets according to the stream-pushing time information. This helps effectively serialize the streaming media data packets.

Figure 2:
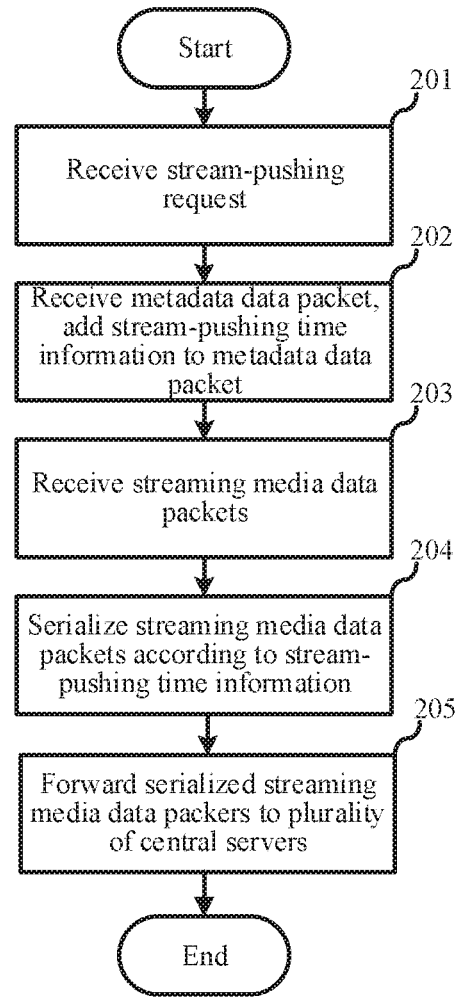
FIG. 2 is a workflow diagram of an edge stream-pushing server in a data distribution system according to some embodiments of the present disclosure.

FIG. 2 shows a workflow diagram of an edge stream-pushing server consistent with the disclosed embodiment, which specifically includes:

Step 201: Receive a stream-pushing request.

Specifically, the edge stream-pushing server receives a stream-pushing request from the stream pusher and establishes a communication connection with the stream pusher. In real applications, after the establishment of the communication connection, if no data is exchanged within a preset time, the connection may be disconnected. The preset time may be set by a person skilled in the art according to actual needs, which is not limited by the present disclosure.

Step 202: Receive a metadata data packet, and add stream-pushing time information to the metadata data packet.

Specifically, the edge stream-pushing server usually receives a metadata data packet first when receiving the data packets sent from the stream-pusher. When the metadata data packet is received, the edge stream-pushing server adds the stream-pushing information to the metadata data packet. In the disclosed embodiment, the stream-pushing information added to the metadata data packet is the stream-pushing time information. In real applications, the stream-pushing information that can be added to the metadata data packet may also include other information.

It should be noted that, in real applications, when the stream pusher is pushing a stream, the data first received by the edge stream-pushing server may be not the metadata data packet. Then, the edge stream-pushing server may identify the metadata data packet among the data packets received later, and add the stream-pushing time information to the identified metadata data packet. That is, the time when the metadata data packet is received is taken as the stream-pushing time, which is added to the metadata data packet as the stream-pushing time information. It should be also noted that the data packets received after the metadata data packet may be all streaming media data packets.

Step 203: Receive streaming media data packets.

Specifically, the edge stream-pushing server receives the streaming media data packets (i.e., actual audio/video data that needs to be played on a user terminal) sent by the stream pusher.

Step 204: Serialize the streaming media data packets according to the stream-pushing time information.

Specifically, a serialization starting point may be determined according to the stream-pushing time information. Here, the serialization starting point is the start time point of starting a stream-pushing. The edge stream-pushing server may distinguish different stream-pushings according to the added stream-pushing time information. When the added stream-pushing time information is detected, it is determined as the start time point of starting a stream-pushing. Starting from this start time point, the streaming media data packets received after the point are subjected to a serialization processing. Since what are received after the metadata data packet, with the added stream-pushing time information, are all streaming media data packets, when the stream-pushing time information added to the metadata data packet is detected, the serialization processing may be started for the subsequently received streaming media data packets.

In real applications, for each streaming media data packet, a serial serialization interface may be used to generate serialization information of each streaming media data packet. The serialization information may include a serial number for the data packet, the system time stamp, the data format, and the extension information, etc. which are provided for other subsequent analysis. Sometimes, the serialization information is also referred to as MapBox information by those skilled in the art. The edge stream-pushing server encapsulates a streaming media data packet into a serialized streaming media data packet according to the serialization starting point and the serial number of each streaming media data packet. For example, the edge stream-pushing server receives 50 data packets. Then, the 50 data packets may be sequentially added a serial number from 1 to 50. The streaming media data packets with the added serial numbers may be encapsulated as serialized streaming media data packets.

It should be noted that, when a renewed stream-pushing is detected, the edge stream-pushing server serializes the newly received streaming media data packets. The stream-pushing time information added to the metadata data packets among the multiple stream-pushings may be different. Therefore, even if a serialization starting point is reduced when compared with the previous serial numbers, it can be told that the serial number (corresponding to the serialization starting point) is reduced due to the renewed stream-pushing. For example, the serialization starting point of the renewed serialization may restart from 0, or it may start from the serial number of the last packet of the last serialization. If the serial number of the last packet of the last serialization is 50, when the received streaming media data packets are serialized, the serialization processing may start with 51 as the serialization starting point. This helps ensure that when there is a renewed stream-pushing, the newly received streaming media data packets may also be serialized, so that it can be satisfied that all the live streaming images will not have problems, such as image repetition, stuttering, etc., under different stream-pushing requests, thereby improving users' watching experience.

Step 205: Forward the serialized streaming media data packets to a plurality of central servers.

Figure 3:
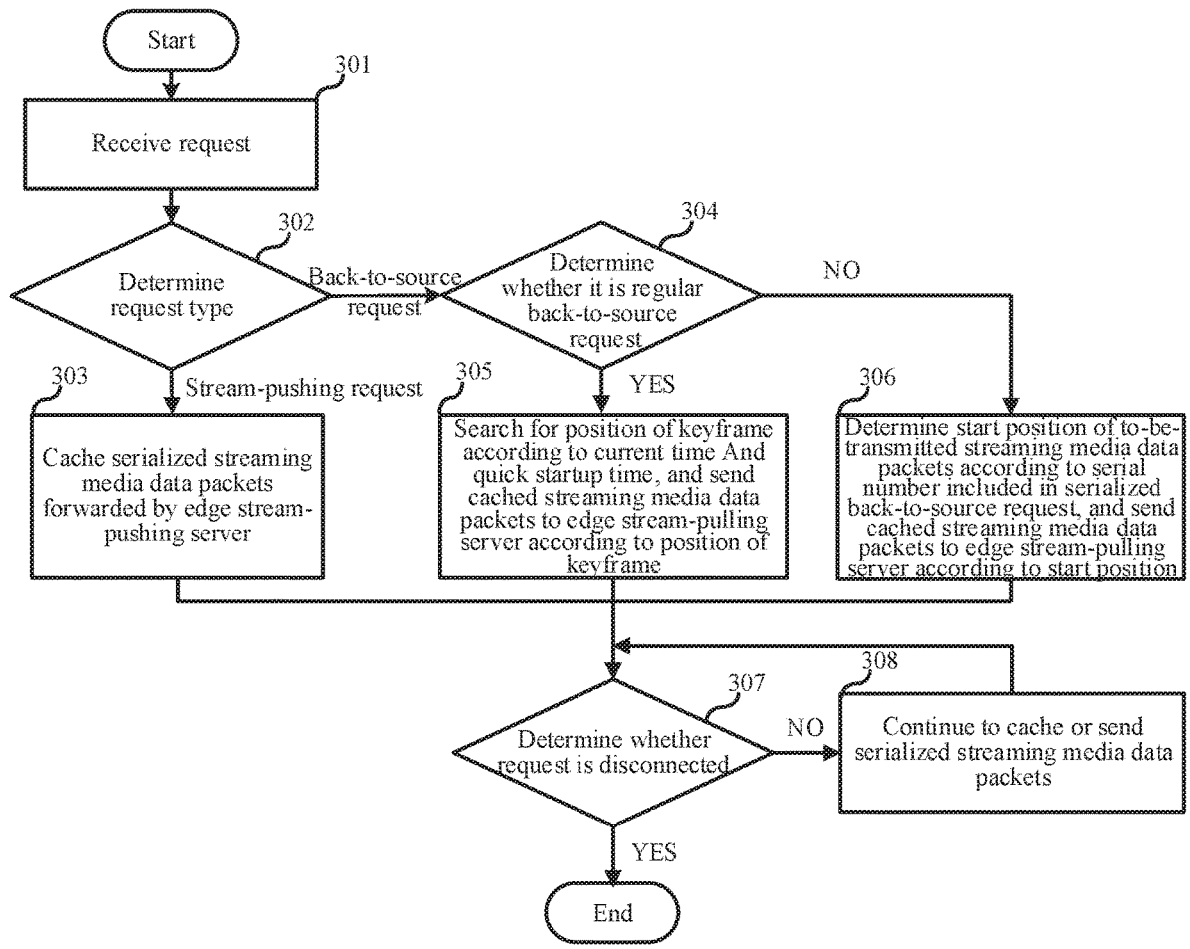
FIG. 3 is a workflow diagram of a central server in a data distribution system according to some embodiments of the present disclosure.

FIG. 3 shows a workflow diagram of a central server consistent with the disclosed embodiment, which specifically includes:

Step 301: Receive a request.

Specifically, the request received by the central server may come from the edge stream-pushing server or the edge stream-pulling server. When a request is received from the edge stream-pushing server, the central server establishes a communication connection with the edge stream-pushing server. When a request is received from the edge stream-pulling server, the central server establishes a communication connection between the central server and the edge stream-pulling server.

Step 302: Determine the type of the request.

Specifically, the request type may include: a stream-pushing request from the edge stream-pushing server, or a back-to-source request from the edge stream-pulling server. When the request type is a stream-pushing request, proceed to Step 303. When the request type is a back-to-source request, proceed to Step 304.

Step 303: Cache the serialized streaming media data packets forwarded by the edge stream-pushing server.

Step 304: Determine whether the request is a regular back-to-source request.

Specifically, since a serialized back-to-source request includes a serial number, determining whether the request is a regular back-to-source request may include: determining whether the back-to-source request includes a serial number; if no serial number is included, it means that the request is a regular back-to-source request, then proceed to Step 305. If there is a serial number included in the request, it means that the request is a serialized back-to-source request, then proceed to Step 306.

Step 305: Find the position of the keyframe according to the current time and the quick startup time, and send the cached streaming media data packets to the edge stream-pulling server according to the position of the keyframe.

Specifically, when a regular back-to-source request is received, similar to the existing methods, the position of the keyframe is searched forward according to the current time and the quick startup time. Start to send the cached streaming media data packets from the position where the keyframe is located.

Step 306: Determine a start position of the to-be-transmitted streaming media data packets according to the serial number included in a serialized back-to-source request, and send the cached streaming media data packets to the edge stream-pulling server according to the start position.

Specifically, a serialized back-to-source request may include a serial number of a streaming media data packet. The central server may extract the serial number from the serialized back-to-source request, and determine a position of the data packet, to which the serial number included in the serialized back-to-source request belongs, as the start position of the to-be-transmitted streaming media data packets. For example, the streaming media data packets cached in the central server include 50 streaming media data packets with the serial numbers of 1 to 50, and the serial number extracted from the serialized back-to-source request is 25. The central server then determines the streaming media data packet with the serial number of 25 as the start position of the to-be-transmitted streaming media data packets, and sends the streaming media data packets with the serial numbers of 25 to 50 to the edge stream-pulling server.

Step 307: Determine whether the request is disconnected.

Specifically, if what is received by the central server is a stream-pushing request, it is then determined whether the stream-pushing request is disconnected. If a back-to-source request is received, it is then determined whether the back-to-source request is disconnected. No matter which request, if the request is disconnected, the process ends. If the request is still connected, proceed to Step 308.

Step 308: Continue to cache or send the serialized streaming media data packets.

Specifically, if a stream-pushing request is received, the serialized streaming media data packets are continuous to be cached. If a back-to-source request is received, the serialized streaming media data packets are continuous to be sent out. While the streaming media data packets are being sent or cached, Step 307 may also be performed simultaneously.

Figure 4:
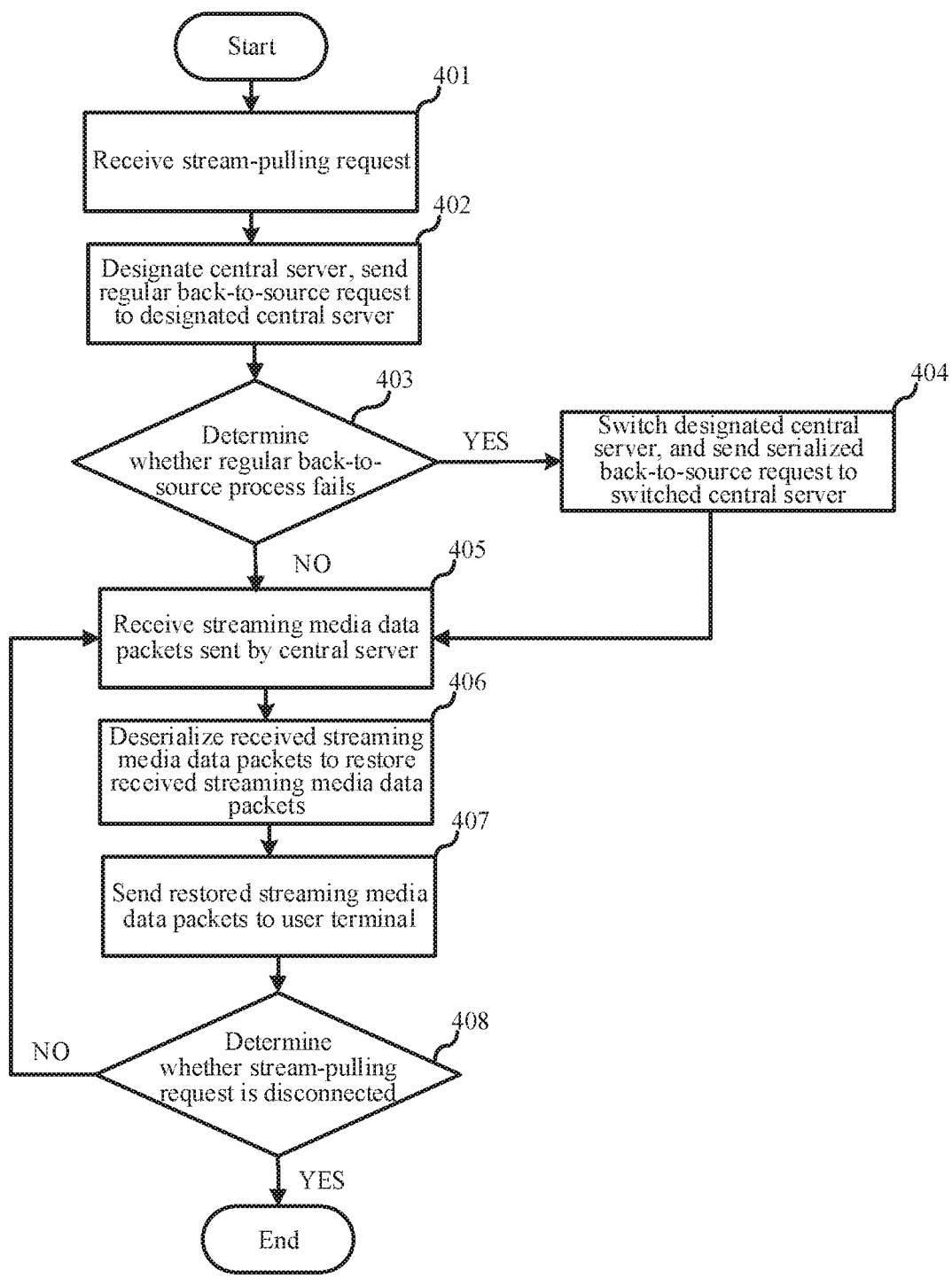
FIG. 4 is a workflow diagram of an edge stream-pulling server in a data distribution system according to some embodiments of the present disclosure.

FIG. 4 shows a workflow diagram of an edge stream-pulling server consistent with the disclosed embodiment, which specifically includes:

Step 401: Receive a stream-pulling request.

Specifically, the edge stream-pulling server receives a stream-pulling request from a user terminal, where the user terminal may be a smart device, such as a mobile phone or a computer, etc. For example, a stream-pulling request sent from a user's mobile phone player is received.

Step 402: Designate a central server and send a regular back-to-source request to the designated central server.

Specifically, when a regular back-to-source request is received, the edge stream-pulling server first needs to send the regular back-to-source request to a designated central server. The method for designating a central server is similar to the methods in the existing technologies. A central server may be designated according to the domain name of each server in combination with a hash algorithm.

Step 403: Determine whether the regular back-to-source process fails.

Specifically, the regular back-to-source process also receives serialized streaming media data packets sent by the central server, and may maintain the latest serial number. When the received streaming media data packets are abnormal, it may be considered that the regular back-to-source process fails. For example, the back-to-source link is disconnected, no streaming media data packets are received within a certain period of time, or the received streaming media data packets are incomplete. If it is determined that the regular back-to-source process fails, proceed to Step 404. If the regular back-to-source process succeeds, proceed to Step 405.

Step 404: Switch the designated central server, and send a serialized back-to-source request to the switched central server.

Specifically, since the edge stream-pulling server consistently maintains the latest serial number, after the regular back-to-source process fails, the currently received latest serial number may be considered as the serial number to be included in the serialized back-to-source request. After determining the to-be-included serial number, a serialized back-to-source request including the serial number is sent to the switched central server.

In real applications, if the edge stream-pulling server detects that the serialized back-to-source process fails, the central server may be switched again. The serialized back-to-source request is sent to a central server, among the plurality of central servers, to which a serialized back-to-source request or a regular back-to-source request has not been sent, until a successful serialized back-to-source process is detected.

Step 405: Receive streaming media data packets sent by the central server.

Step 406: Deserialize the received streaming media data packets to restore the received streaming media data packets.

Specifically, since the received streaming media data packets are serialized streaming media data packets, that is, each data packet has a corresponding serial number, deserializing the received streaming media data packets may be understood as removing the serial number corresponding to each data packet to restore the received streaming media data packets to ensure that the restored streaming media data is a data packet conforming to the streaming protocol.

Step 407: Send the restored streaming media data packets to the user terminal.

Step 408: Determine whether the stream-pulling request is disconnected.

Specifically, if no data interaction is conducted within a certain period of time, the stream-pulling request may be considered as being disconnected. Then disconnect the back-to-source connection, and end the process. If the stream-pulling request is still connected, proceed to Step 405.

Compared with the existing technologies, in the disclosed embodiment, the edge stream-pushing server is specifically configured to, for each streaming media data packet, generate a serial number for each streaming media data packet using a serial serialization interface. According to the serialization starting point and the serial number of each streaming media data packet, the streaming media data packets are encapsulated into serialized streaming media data packets. The serial numbers generated through the serial serialization interface are useful in signifying the sequence of different streaming media data packets, which is convenient for serializing the streaming media data packets. In addition, a serialized back-to-source request includes a serial number. The central servers are specifically configured to determine the start position of the to-be-transmitted streaming media data packets according to the serial number included in the serialized back-to-source request, and send the cached streaming media data packets to the edge stream-pulling server according to the start position. The serial number included in the request helps a central server to quickly determine the start position of the to-be-transmitted streaming media data packets based on the received serialized back-to-source request.

Embodiment 3 of the present disclosure relates to a data distribution system. Embodiment 3 is a further improvement of Embodiment 2. The main improvement lies in that: in Embodiment 3 of the present disclosure, the edge stream-pushing server is further configured to encrypt the serialized streaming media data packets using a preset encryption algorithm, to ensure the security and confidentiality of the streaming media data packets during transmission.

Figure 5:
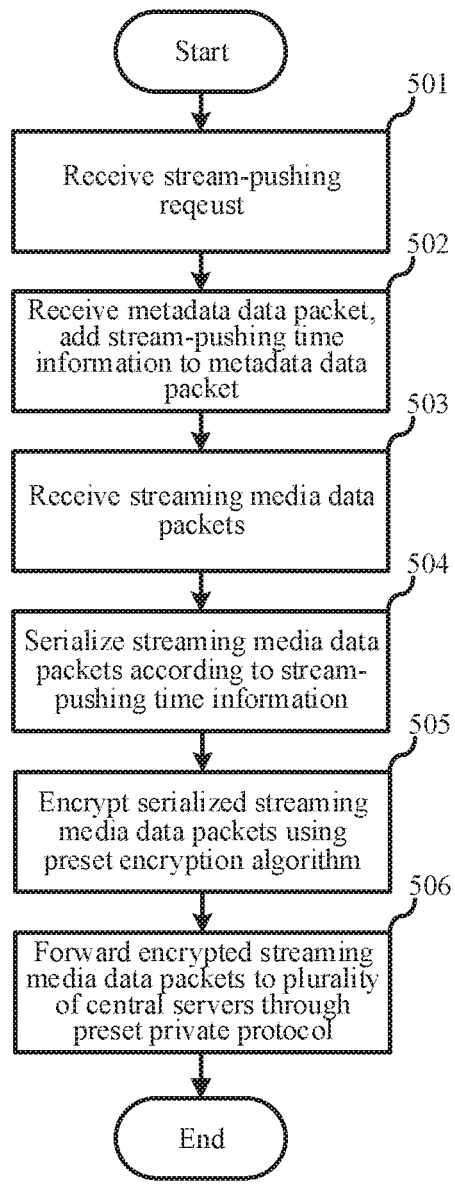
FIG. 5 is a workflow diagram of an edge stream-pushing server in another data distribution system according to some embodiments of the present disclosure.

FIG. 5 shows a workflow diagram of an edge stream-pushing server consistent with the disclosed embodiment, which specifically includes:

Step 501: Receive a stream-pushing request.

Step 502: Receive a metadata data packet, and add stream-pushing time information to the metadata data packet.

Step 503: Receive streaming media data packets.

Step 504: Serialize the streaming media data packets according to the stream-pushing time information.

Specifically, Steps 501 to 504 in the present embodiment are substantially the same as Steps 201 to 204 in Embodiment 2, which will not be repeated again here to avoid repetition.

Step 505: Encrypt the serialized streaming media data packets by using a preset encryption algorithm.

Specifically, the edge stream-pushing server may pre-store the encryption algorithm. After the serialization of the streaming media data packets, the streaming media data packets are encrypted by using the stored encryption algorithm.

Step 506: Forward the encrypted streaming media data packets to the plurality of central servers by using a preset private protocol.

Specifically, the edge stream-pushing server forwards the encrypted streaming media data packets to the plurality of central servers through a preset private protocol. A private protocol essentially is a standard internally developed and adopted by a manufacturer, and is closed, monopolistic, exclusive, etc., which ensures the privacy of data being transmitted from the edge stream-pushing server to the plurality of central servers. Generally, the live streaming media data is in RTMP or FLV format, and all the live streaming media data are standard header+body data. The private protocol in the disclosed embodiment converts a standard header into a private header, which includes a timestamp, audio/video type, data length, serial number information, and extended field information, etc.

Figure 6:
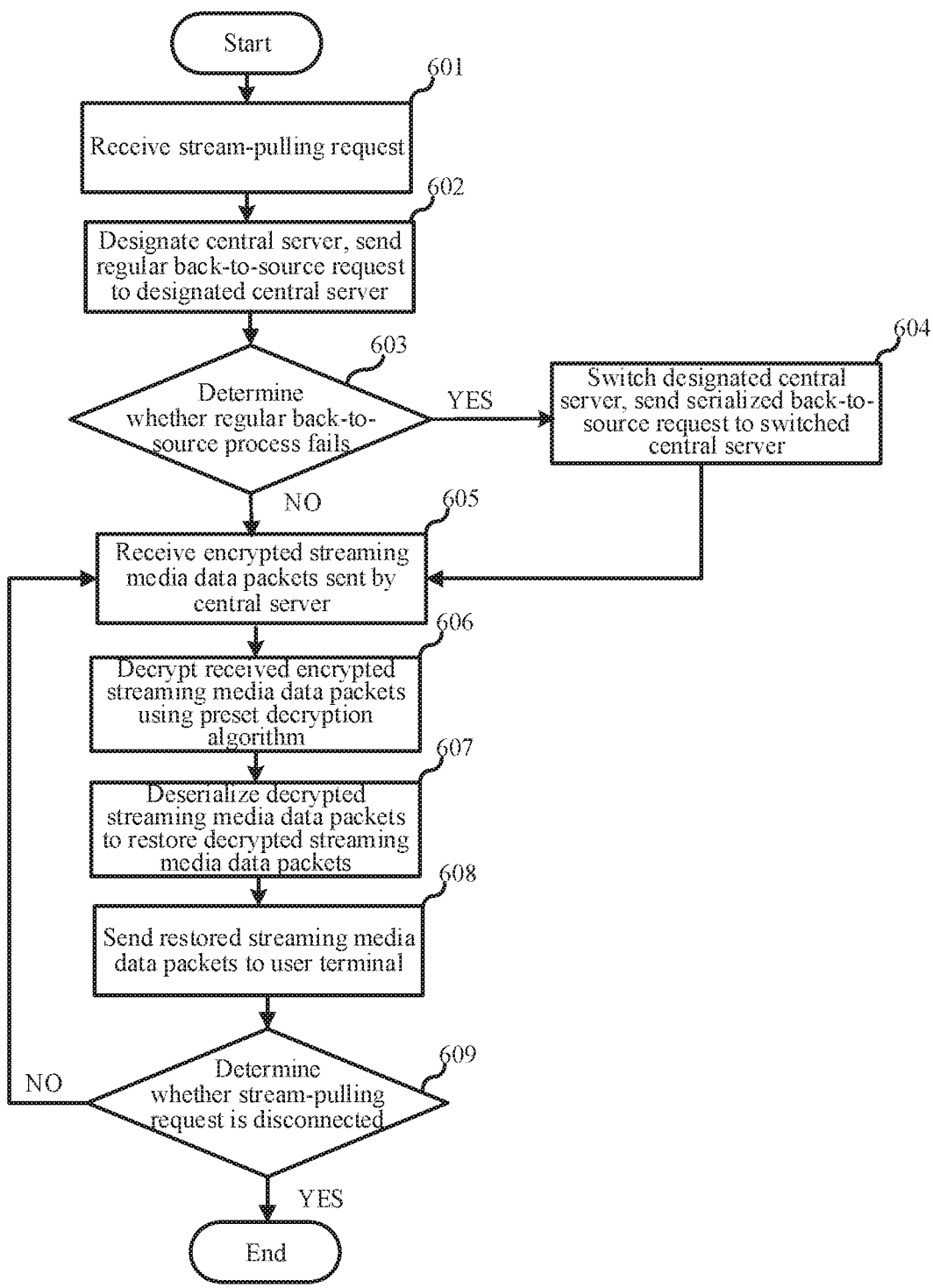
FIG. 6 is a workflow diagram of an edge stream-pulling server in another data distribution system according to some embodiments of the present disclosure.

FIG. 6 shows a workflow diagram of an edge stream-pulling server consistent with the disclosed embodiment.

Step 601: Receive a stream-pulling request.

Step 602: Designate a central server and send a regular back-to-source request to the designated central server.

Step 603: Determine whether the regular back-to-source process fails. If it is determined that the regular back-to-source process fails, proceed to Step 604. If the regular back-to-source process succeeds, proceed to Step 605.

Step 604: Switch the designated central server, and send a serialized back-to-source request to the switched central server.

Specifically, Steps 601 to 604 in the present embodiment are substantially the same as Steps 401 to 404 in Embodiment 2, which will not be repeated again here to avoid repetition.

Step 605: Receive encrypted streaming media data packets sent by the central server.

Step 606: Decrypt the received encrypted streaming media data packets by using a preset decryption algorithm.

Specifically, the preset decryption algorithm used by the edge stream-pulling server matches the preset encryption algorithm used by the edge stream-pushing server, and may decrypt the streaming media data packets encrypted by the edge stream-pushing server.

Step 607: Deserialize the decrypted streaming media data packets to restore the decrypted streaming media data packets.

Step 608: Send the restored streaming media data packets to the user terminal.

Step 609: Determine whether the stream-pulling request is disconnected.

Specifically, Steps 607 to 609 in the present embodiment are substantially the same as Step 406 to 408 in Embodiment 2, except that: the streaming media data packets received by the edge stream-pulling server in the present embodiment are encrypted stream media data packets; and in Embodiment 2, the streaming media data packets are restored, while in the present embodiment, the encrypted streaming media data packets are restored. To avoid repetition, the details are not repeated again here.

Compared with the existing technologies, in the disclosed embodiment, the edge stream-pushing server is specifically configured to forward the encrypted streaming media data packets to a plurality of central servers through a preset private protocol. Through the private protocol, the privacy and exclusivity of the streaming media data packets will be protected during the transmission process. The edge stream-pushing server is further configured to serialize the newly received streaming media data packets when a renewed stream-pushing is detected. This helps ensure that, when a renewed stream-pushing is performed, the newly received streaming media data packets may also be serialized, so that it can be satisfied that, for different stream-pushing requests, all the live streaming images will not have problems such as image repetition and stuttering. This improves users' watching experience.

Embodiment 4 of the present disclosure relates to a data distribution method. The data distribution method of the disclosed embodiment includes: the edge stream-pushing server receives streaming media data packets sent by a stream pusher, performs a serialization processing on the streaming media data packets, and forwards the serialized streaming media data packets to a plurality of central servers; the central servers cache the serialized streaming media data packets; if a central server receives a serialized back-to-source request from the edge stream-pulling server, the central server determines, according to the serialized back-to-source request, the start position of the to-be-transmitted streaming media data packets; the central server sends the cached streaming media data packets to the edge stream-pulling server according to the start position of the to-be-transmitted streaming media data packets; the edge stream-pulling server deserializes the received streaming media data packets to restore the received streaming media data packets; and the edge stream-pulling server sends the restored streaming media data packets to a user terminal. The implementation of the data distribution system of the disclosed embodiment will be made in detail hereinafter. The following description is merely for better understanding of the provided implementation details, but should not be constructed as the requirement for implementing the technology disclosed herein.

Figure 7:
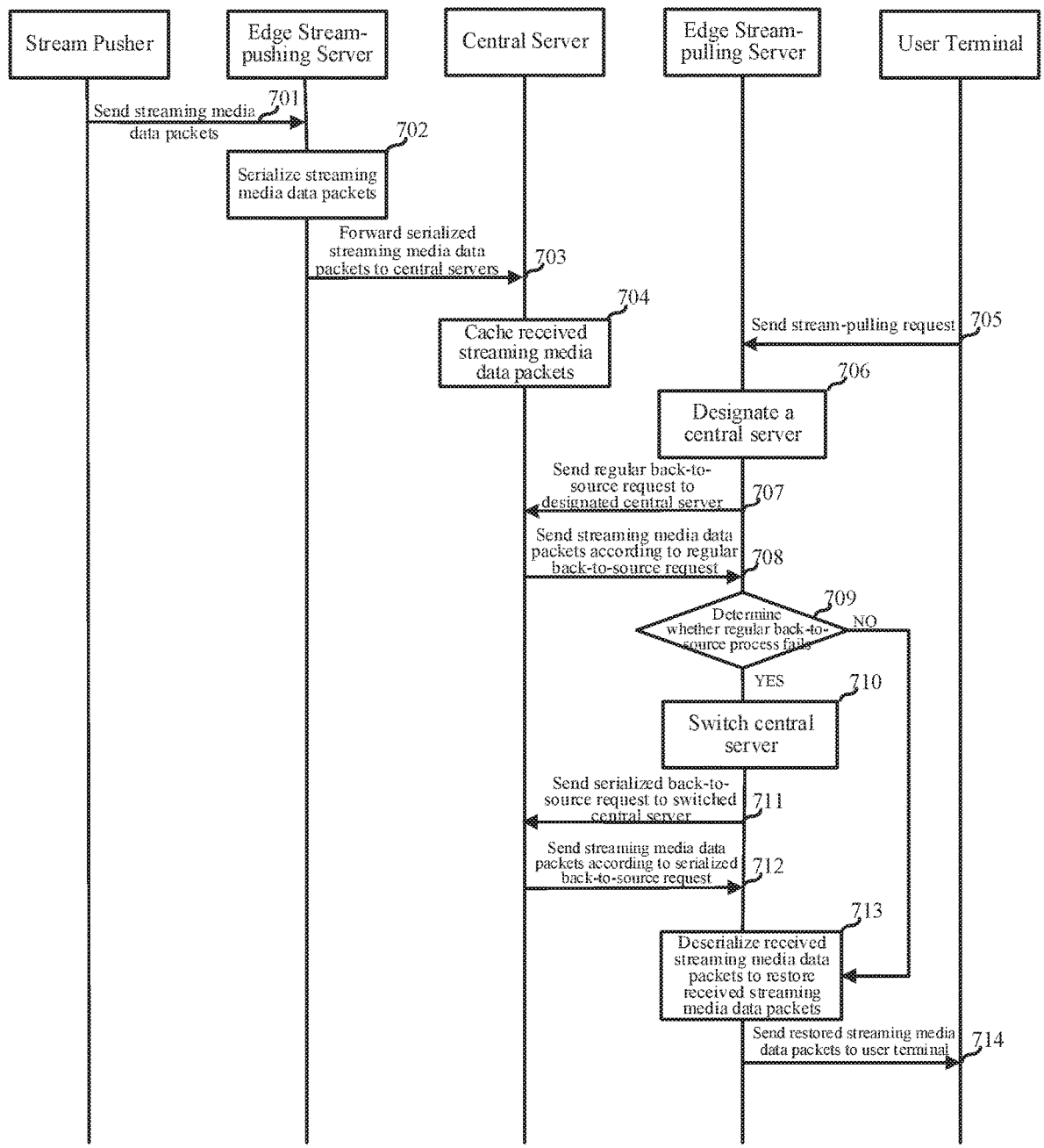
FIG. 7 is a flowchart of a data distribution method according to some embodiments of the present disclosure.

FIG. 7 shows a flowchart of a data distribution method consistent with the disclosed embodiment, which specifically includes:

Step 701: The edge stream-pushing server receives the streaming media data packets sent by the stream pusher.

Step 702: The edge stream-pushing server serializes the streaming media data packets.

Step 703: The edge stream-pushing server forwards the serialized streaming media data packets to the central servers.

Step 704: The central servers cache the received streaming media data packets.

Step 705: A user terminal sends a stream-pulling request to the edge stream-pulling server.

Step 706: The edge stream-pulling server designates a central server.

Specifically, the steps shown under "central server" in FIG. 7 represent the steps that need to be completed on a central server side, where the central server side may include a plurality of central servers. Therefore, the edge stream-pulling server needs to designate one of the plurality of central servers to send a regular back-to-source request. Specifically, a central server may be designated according to the domain name of each central server in combination with a hash algorithm.

Step 707: The edge stream-pulling server sends a regular back-to-source request to the designated central server.

Step 708: The designated central server sends the streaming media data packets according to the regular back-to-source request.

Specifically, the streaming media data packets sent by the central server are received by the edge stream-pulling server. After the edge stream-pulling server receives the serialized streaming media data packets, proceed to Step 713.

Step 709: The edge stream-pulling server determines whether the regular back-to-source process fails. If the regular back-to-source process fails, proceed to Step 710. If the regular back-to-source process succeeds, proceed to Step 713.

Step 710: The edge stream-pulling server switches the designated central server.

Specifically, the edge stream-pulling server may re-designate a central server among the central servers other than the central servers to which the regular back-to-source request has been sent.

Step 711: The edge stream-pulling server sends a serialized back-to-source request to the switched central server.

Step 712: The switched central server sends the streaming media data packets according to the serialized back-to-source request.

Step 713: The edge stream-pulling server deserializes the received streaming media data packets to restore the received streaming media data packets.

Step 714: The edge stream-pulling server sends the restored streaming media data packets to a user terminal.

It is not difficult to see that the present embodiment is a method embodiment corresponding to Embodiment 1. The present embodiment may be implemented in cooperation with Embodiment 1. The related technical details discussed in Embodiment 1 are still valid in the present embodiment, and are not to be described again here to reduce repetition. Accordingly, the related technical details discussed in the present embodiment may also be applied to Embodiment 1.

Embodiment 5 of the present disclosure relates to a data distribution method. Embodiment 5 is a further improvement of Embodiment 4. The main improvement lies in that: in Embodiment 5 of the present disclosure, the streaming media data packets are serialized by using the following method: receiving a metadata data packet sent by the stream pusher; add the stream-pushing time information to the metadata data packet; and perform a serialization processing on the streaming media data packets according to the stream-pushing time information. This facilitates an effective serialization processing of the streaming media data packets.

It is not difficult to see that the present embodiment is a method embodiment corresponding to Embodiment 2. The present embodiment may be implemented in cooperation with Embodiment 2. The related technical details discussed in Embodiment 2 are still valid in the present embodiment, and are not described again here to reduce repetition. Accordingly, the related technical details discussed in the present embodiment may also be applied to Embodiment 2.

Embodiment 6 of the present disclosure relates to a data distribution method. Embodiment 6 is a further improvement of Embodiment 5. The main improvement lies in that: in Embodiment 6 of the present disclosure, the edge stream-pushing server encrypts the serialized streaming media data packets by using a preset encryption algorithm, to ensure the security and confidentiality of the streaming media data packets during transmission.

It is not difficult to see that the present embodiment is a method embodiment corresponding to Embodiment 3. The present embodiment may be implemented in cooperation with Embodiment 3. The related technical details discussed in Embodiment 3 are still valid in the present embodiment, and are not described again here to reduce repetition. Accordingly, the related technical details discussed in the present embodiment may also be applied to Embodiment 3.

The steps of the above various methods are divided merely for the purpose of clear description. During the implementations, multiple steps may be combined into one step or one step may be split into certain steps or decomposed into multiple steps. As long as the same logical relationship is included, these implementations shall still fall within the protection scope of the present disclosure. The addition of insignificant modifications to an algorithm or process, or the introduction of an insignificant design, without changing the core design of the algorithm and process, should still fall within the protection scope of the present disclosure.

Embodiment 7 of the present disclosure relates to a computer-readable storage medium storing a computer program. The computer program, when executed by a processor, implements the above-described method embodiments.

A person skilled in the art may understand that all or part of the steps of the foregoing embodiments may take the form of implementation of programs for instructing relevant hardware. The programs may be stored in a storage medium, and include a series of instructions that enable a device (may be a microcontroller, a chip, etc.) or a processor to perform all or part of the steps of each embodiment of the present disclosure. The storage medium includes various media for storing program code, such as a flash drive, a mobile hard drive, a read-only memory (ROM), a random access memory (RAM), a magnetic disk, or an optical disk, and the like.

A person skilled in the art may understand that the foregoing embodiments are merely specific embodiments for implementing the present disclosure. In real applications, various modifications may be made in the form and details of these embodiments without departing from the spirit and principle of the present disclosure.

What is claimed is:

1. A data distribution system, comprising: an edge stream-pushing server, a plurality of central servers, and an edge stream-pulling server; wherein, the edge stream-pushing server is configured to receive streaming media data packets sent by a stream pusher, serialize the streaming media data packets, and forward the serialized streaming media data packets to the plurality of central servers;

a central server is configured to cache the serialized streaming media data packets, if a serialized back-to-source request from the edge stream-pulling server is received, determine, a start position of to-be-transmitted streaming media data packets according to the serialized back-to-source request, and send the cached streaming media data packets to the edge stream-pulling server according to the start position; and the edge stream-pulling server is configured to deserialize received streaming media data packets to restore the received streaming media data packets, and send the restored streaming media data packets to a user terminal.

2. The data distribution system according to claim 1, wherein the edge stream-pushing server is further configured to receive a metadata data packet sent by the stream pusher, add stream-pushing time information to the metadata data packet, and serialize the streaming media data packets according to the stream-pushing time information.

3. The data distribution system according to claim 2, wherein the edge stream-pushing server is further configured to determine a serialization starting point according to the stream-pushing time information, and serialize the streaming media data packets according to the serialization starting point.

4. The data distribution system according to claim 3, wherein the edge stream-pushing server is further configured to generate, for each of the streaming media data packets, a serial number of each of the streaming media data packets using a serial serialization interface, and encapsulate the streaming media data packets into the serialized streaming media data packets according to the serialization starting point and the serial number of each of the streaming media data packets.

5. The data distribution system according to claim 4, wherein the serialized back-to-source request includes a serial number, and the central server is further configured to determine a position of a data packet, to which the serial number included in the serialized back-to-source request belongs, as the start position of the to-be-transmitted streaming media data packets.

6. The data distribution system according to claim 5, wherein the edge stream-pulling server is further configured to determine the serial number included in the serialized back-to-source request according to serial numbers of the received streaming media data packets, wherein the determined serial number is a serial number of a streaming media data packet received latest by the edge stream-pulling server.

7. The data distribution system according to claim 1, wherein:

the edge stream-pulling server is further configured to, when a stream-pulling request sent by the user terminal is received, designate a central server, and send a regular back-to-source request to the designated central server; and the designated central server is further configured to, if the regular back-to-source request is received, determine the start position of the to-be-transmitted streaming media data packets according to the regular back-to-source request, and send the cached streaming media data packets to the edge stream-pulling server according to the start position of the to-be-transmitted streaming media data packets.

8. The data distribution system according to claim 7, wherein the designated central server is further configured to search for a position of a keyframe according to a current time and a quick startup time, and assign the position of the keyframe as the start position of the to-be-transmitted streaming media data packets determined according to the regular back-to-source request.

9. The data distribution system according to claim 7, wherein the edge stream-pulling server is further configured to, if it is detected that a regular back-to-source process fails, switch the designated central server, and send the serialized back-to-source request to the switched central server.

10. The data distribution system according to claim 9, wherein the edge stream-pulling server is further configured to, if it is detected that a serialized back-to-source process fails, sends the serialized back-to-source request to a central server, among a plurality of central servers, to which the serialized back-to-source request or the regular back-to-source request has not been sent, until a successful serialized back-to-source process is detected.

11. The data distribution system according to claim 1, wherein:

the edge stream-pushing server is further configured to encrypt the serialized streaming media data packets by using a preset encryption algorithm, and forward the encrypted streaming media data packets to the plurality of central servers; and the edge stream-pulling server is further configured to decrypt the received encrypted streaming media data packets by using a preset decryption algorithm.

12. The data distribution system according to claim 11, wherein the edge stream-pushing server is further configured to forward the encrypted streaming media data packets to the plurality of central servers by using a preset private protocol.

13. The data distribution system according to claim 1, wherein the edge stream-pushing server is further configured to serialize newly received streaming media data packets when a renewed stream-pushing is detected.

14. A data distribution method, comprising:

receiving, by an edge stream-pushing server, streaming media data packets sent by a stream pusher;

serializing, by the edge stream-pushing server, the streaming media data packets, and forwarding, by the edge stream-pushing server, the serialized streaming media data packets to a plurality of central servers;

caching, by the plurality of central servers, the serialized streaming media data packets;

if a central server receives a serialized back-to-source request from an edge stream-pulling server, determining, by the central server, a start position of to-be-transmitted streaming media data packets according to the serialized back-to-source request;

sending, by the central server, the cached streaming media data packets to the edge stream-pulling server according to the start position of the to-be-transmitted streaming media data packets;

deserializing, by the edge stream-pulling server, received streaming media data packets to restore the received streaming media data packets; and sending, by the edge stream-pulling server, the restored streaming media data packets to a user terminal.

15. The data distribution method according to claim 14, wherein serializing, by the edge stream-pushing server, the streaming media data packets further includes:
- receiving a metadata data packet sent by the stream pusher;
- adding stream-pushing time information to the metadata data packet; and
- serializing the streaming media data packets according to the stream-pushing time information.

16. The data distribution method according to claim 15, wherein serializing the streaming media data packets according to the stream-pushing time information further includes:
- determining a serialization starting point according to the stream-pushing time information; and
- serializing the streaming media data packets according to the serialization starting point.

17. The data distribution method according to claim 16, wherein serializing the streaming media data packets according to the serialization starting point further includes:
- generating, for each of the streaming media data packets, a serial number of each of the streaming media data packets using a serial serialization interface; and
- encapsulating the streaming media data packets into the serialized streaming media data packets according to the serialization starting point and the serial number of each of the streaming media data packets.

18. The data distribution method according to claim 17, wherein:
- the serialized back-to-source request including a serial number; and
- determining, by the central server, the start position of the to-be-transmitted streaming media data packets according to the serialized back-to-source request further includes:
- determining a position of a data packet, to which the serial number included in the serialized back-to-source request belongs, as the start position of the to-be-transmitted streaming media data packets.

19. The data distribution method according to claim 18, wherein the serial number included in the serialized back-to-source request sent by the edge stream-pulling server is determined by:
- determining the serial number included in the serialized back-to-source request according to serial numbers of the received streaming media data packets, wherein the determined serial number is a serial number of a streaming media data packet received latest by the edge stream-pulling server.

20. A computer-readable non-transitory storage medium storing a computer program, wherein the computer program, when executed by a processor, implements a data distribution method that includes
- receiving, by an edge stream-pushing server, streaming media data packets sent by a stream pusher;
- serializing, by the edge stream-pushing server, the streaming media data packets, and forwarding, by the edge stream-pushing server, the serialized streaming media data packets to a plurality of central servers;
- caching, by the plurality of central servers, the serialized streaming media data packets;
- if a central server receives a serialized back-to-source request from an edge stream-pulling server, determining, by the central server, a start position of to-be-transmitted streaming media data packets according to the serialized back-to-source request;
- sending, by the central server, the cached streaming media data packets to the edge stream-pulling server according to the start position of the to-be-transmitted streaming media data packets;
- deserializing, by the edge stream-pulling server, received streaming media data packets to restore the received streaming media data packets; and
- sending, by the edge stream-pulling server, the restored streaming media data packets to a user terminal.

* * * * *